July 29, 1952  R. B. BROWN  2,604,906
AUTOMATIC CONTROL VALVE FOR MEASURING APPARATUS
Filed Dec. 14, 1948  3 Sheets-Sheet 1
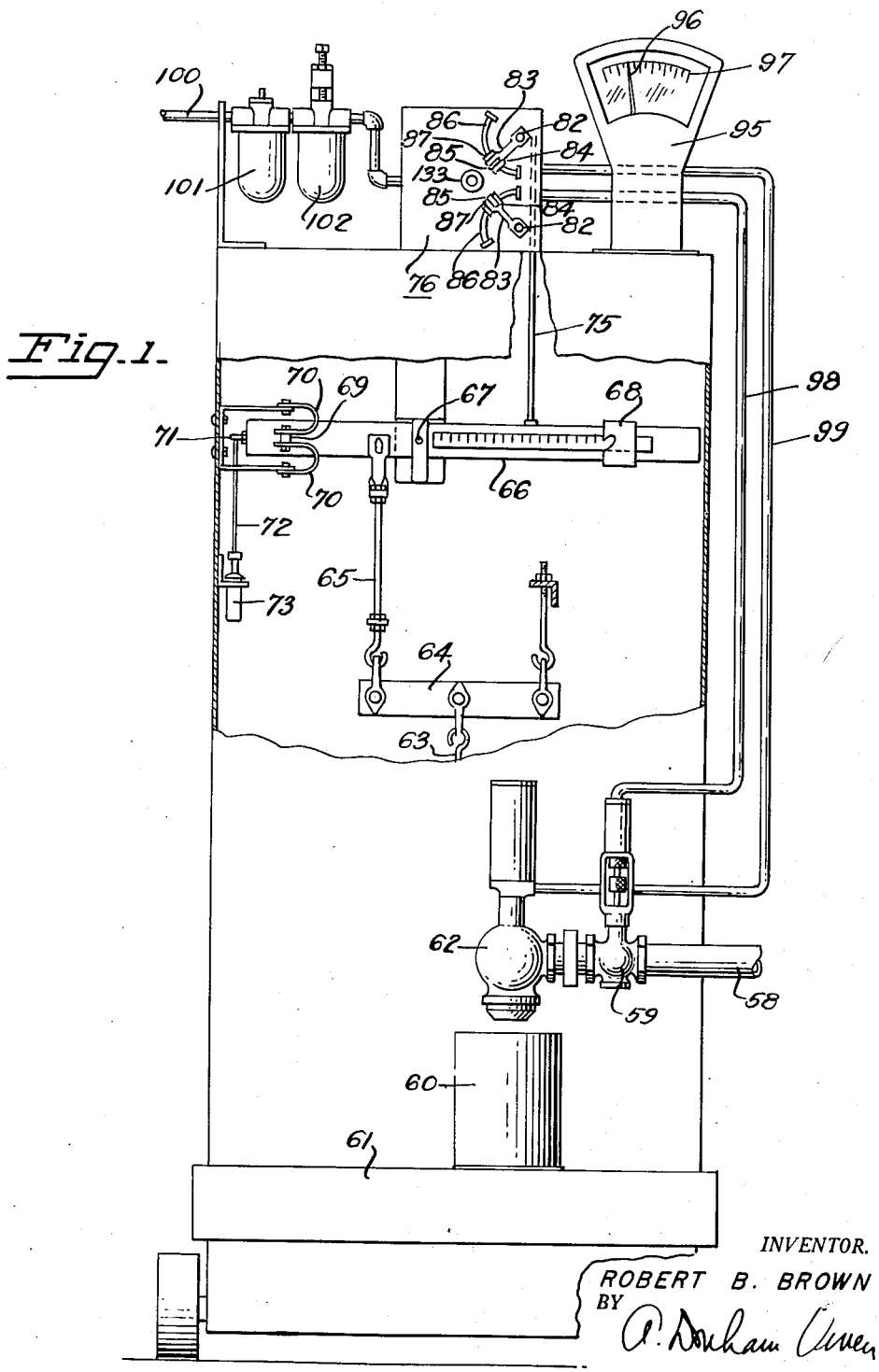
INVENTOR.
ROBERT B. BROWN
BY
ATTORNEY

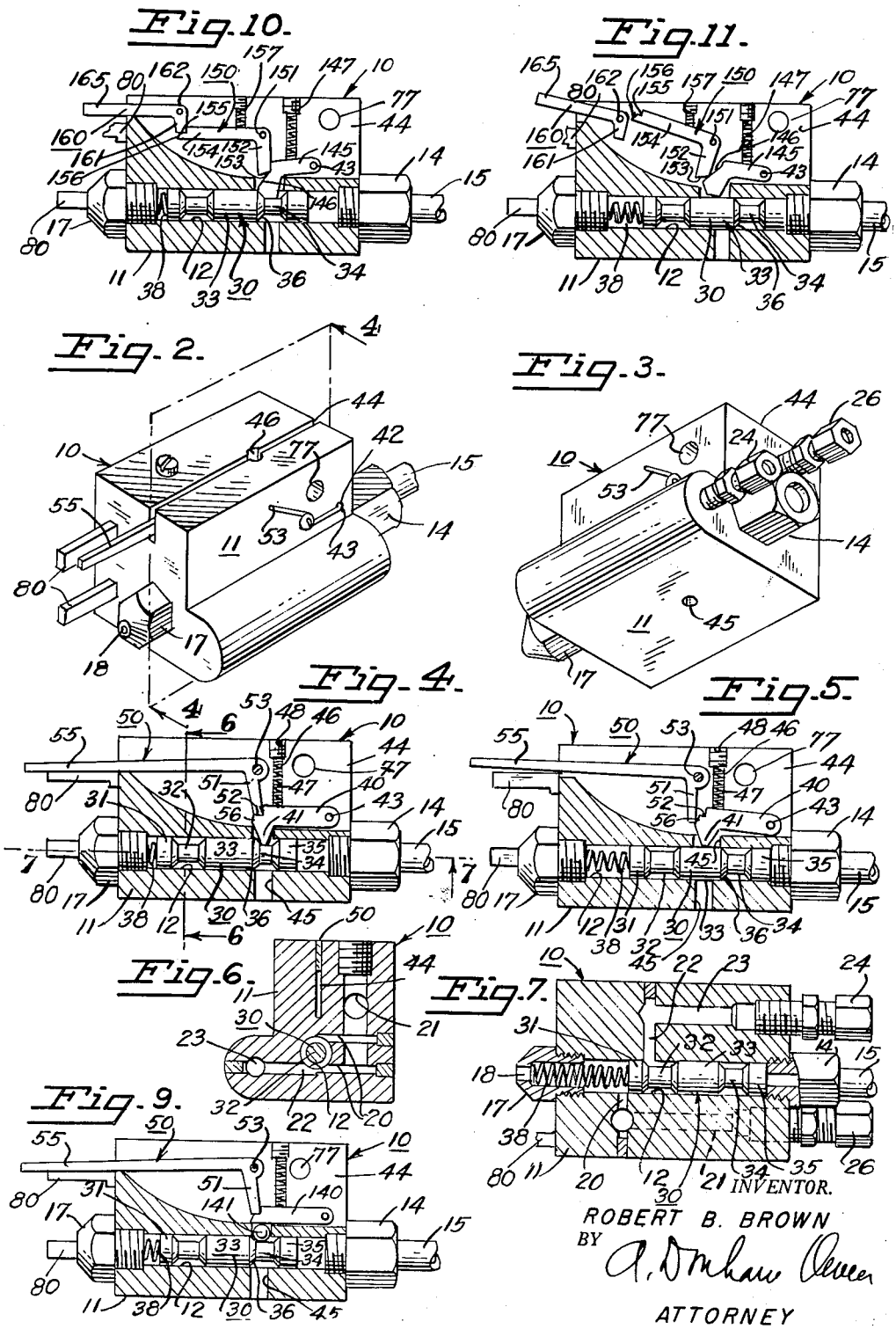

July 29, 1952 R. B. BROWN 2,604,906
AUTOMATIC CONTROL VALVE FOR MEASURING APPARATUS
Filed Dec. 14, 1948 3 Sheets-Sheet 3

INVENTOR.
ROBERT B. BROWN
BY
ATTORNEY

Patented July 29, 1952

2,604,906

UNITED STATES PATENT OFFICE 2,604,906

AUTOMATIC CONTROL VALVE FOR MEASURING APPARATUS

Robert B. Brown, San Francisco, Calif., assignor to T. R. Mantes, San Francisco, Calif.

Application December 14, 1948, Serial No. 65,251

20 Claims. (Cl. 137—693)

This invention relates to an improved air control valve and to an automatic measuring apparatus employing this improved valve.

An important accomplishment of this invention is that it makes possible safe use of automatic measuring equipment with explosive materials. Automatic measurement of gasoline, for example, is extremely dangerous when electrical control devices are used, because a single spark may lead to the destruction of an entire factory. The cost of making electrical controls "explosion proof" is far greater than the entire cost of a complete system employing this present invention. This invention solves the problem of safe automatic measurement of explosive materials since it does not use electricity anywhere in the system, but instead provides a sensitive, accurate air pressure for control for the filling valves. In a divisional application of this application, Serial Number 144,872, filed January 16, 1950, the automatic weighing and filling system shown herein is claimed.

The valve of this invention is also capable of use with non-explosive materials, especially where air-operated valves are used. For example, another problem solved by the invention is the direct control of air-operated valves, an especially efficient example of which is disclosed in my copending application, Serial No. 65,252, filed December 14, 1948, and now abandoned. Prior air valve controls have either lacked the requisite sensitivity or have been unable to handle a large enough air current by themselves and have had to be supplemented by relays and additional valves. The air control valve of this invention has both great sensitivity and a capacity for handling large air currents with no supplemental valves or relays needed.

A further problem in the past has been that of achieving an automatic, positive, and permanent cutoff. In air control valves heretofore available there has been the danger that if the air current supplying the control valve were cut off, the feed valve would continue to deliver material, or it might start in again accidentally. This was not only wasteful and untidy, it was extremely dangerous when explosive material would splash out over the top of a full container. With this invention the feed valve is cut off when the desired quantity has been measured, and the control valve is locked so that the feed valve cannot open again until the filled container is removed from the scale and an empty one put in place of it.

One object of the invention is to provide an air control valve which solves the above problems.

Another object of the invention is to provide an air control valve suitable for use in the automatic measurement of explosive and other materials.

Another object of the invention is to provide a sensitive valve for controlling a relatively large stream of air.

Another object of the invention is to provide a valve which can directly control the air stream operating another valve and, therefore, does not require supplemental valves or relays.

Another object of the invention is to provide an air control valve which, when tripped, remains locked in the "off" position until purposely reset.

Another object of the invention is to provide a novel reset mechanism for an air control valve.

Another object of the invention is to provide a sensitive latch and latch-tripping mechanism for an air control valve.

Another object of the invention is to provide an improved latch mechanism in an air control valve which will catch securely when being reset.

Another object of the invention is to provide a control valve which in its "off" position will bleed or exhaust the air from the work outlet conduit and thereby relieve the pressure on the controlled device.

Other objects and advantages of the invention will appear from the following description. In accordance with U. S. Revised Statutes, section 4888, specific devices are described in detail, but it is not intended that the invention be thereby limited except as required by the appended claims.

In the drawings:

Fig. 1 is a view in elevation and partly in section of an automatic weighing device embodying the principles of this invention;

Fig. 2 is a view in perspective, looking from above, of an air control valve embodying the principles of the invention;

Fig. 3 is a view in perspective, looking from below, of the valve shown in Fig. 2;

Fig. 4 is a view in section taken along the plane 4—4 in Fig. 2, with the valve being shown in its latched or "on" position;

Fig. 5 is a view similar to Fig. 4, with the valve in its unlatched or "off" position;

Fig. 6 is a view in section taken along the line 6—6 in Figs. 4 and 8;

Fig. 7 is a view in section taken along the line 7—7 in Fig. 4;

Fig. 9 is a view similar to Fig. 4 showing a modified form of latching device.

Fig. 10 is a view similar to Fig. 4 showing a modified form of latch and latch release;

Fig. 11 is a view similar to Fig. 10 with the valve shown in its unlatched or "off" position;

Figures 8, 12, 13:
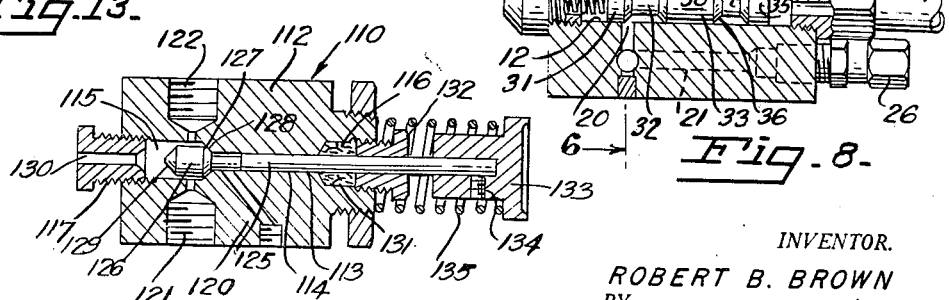
Fig. 8 is a view similar to Fig. 7 with the valve shown in its unlatched or "off" position.
Fig. 12 is a rear view in elevation and partly in section of a control box for an automatic measuring device, comprising two air control valves and a reset mechanism therefor; the adjusting mechanism on the front of the box being shown in dotted lines.
Fig. 13 is a view in section of the reset valve shown in Fig. 12.

This invention provides an air-operated control valve described here in connection with an automatic measuring system, which is claimed in divisional application, Serial No. 144,872, filed January 16, 1950. Among the air-controlled feed valves which can be used in this system, particularly satisfactory results are obtained with the feed valve shown in Fig. 1 and described and claimed in copending application, Serial No. 65,252, filed December 14, 1948. There the dump valve is urged by a spring to a normally closed position, and is forced open by compressed air. The other valve has a maximum and a minimum open position. The present invention is directed to a novel control valve for turning on and off the stream of compressed air to these valves.

The control valve includes a sliding spool valve in a passageway which is joined by an inlet conduit, an outlet work conduit, and an exhaust or bleed conduit. A latch mechanism normally holds the valve in open position, so that air may pass from the inlet conduit around the spool to the work conduit, while a piston on the spool valve blocks off the exhaust conduit. When the latch is tripped, a spring forces the valve over into the closed position so the air inlet conduit is blocked off by the piston, and the air in the work conduit is bled off through the exhaust conduit. The invention also includes means to reset the valve to its latched position.

The particular forms of valve illustrated in the drawings will now be discussed. Figs. 2 through 8 show a preferred form of air control valve 10. Its housing 11 may be bossed, bored, and grooved to provide the conduits and to accommodate the moving parts. A valve passageway 12 extends from one end of the housing 11 to the other. At one end of the passageway 12 is a hollow fitting 14, to which the reset air conduit 15 may be connected. (See Fig. 12.) In the other end of the passageway 12 is threaded an exhaust fitting 17, having an opening 18 therethrough. (See Figs. 2 and 7.)

Adjacent the exhaust fitting 17 and on both sides of the passageway 12 are two ports 20 (see Figs. 6, 7 and 8) which lead to the outlet work conduit 21. The twin ports 20 are preferable because they assure better balance and quicker action than a single large port, but a single port will also give satisfactory results.

A single inlet port 22 joins the passageway 12 at a point further in from the fitting 17 than the outlet ports 20. In the inlet conduit 23 is a fitting 24 to which may be secured the outside air inlet tube 25. (See Fig. 12.) A similar fitting 26 may be threaded into the outlet conduit 21 and to the fitting 26 the outside air outlet tube 27 may be secured. When the valve 10 is in its "on" position (Fig. 4), the tube 27 carries a stream of compressed air to the controlled valve, which may be the feed valve 62 in Fig. 1.

Inside the passageway 12 is a slidable valve stem 30 comprising two spools 32 and 34 between three pistons 31, 33 and 35. The spools 32 and 34 will pass air, but no substantial amount of air can leak past the pistons 31, 33 and 35. The end piston 31 faces the fitting 17. Adjacent it is the spool 32 which passes air between the inlet port 22 and outlet ports 20 when the valve is in its "on" position (see Figs. 4 and 7). The other end of the spool is closed by the central piston 33. A second, latch-engaging spool 34 is adjacent the piston 33 and at the far end of the stem 30 is the reset piston 35. Preferably the shoulders 36 of the spools are sloped.

The valve 30 is urged toward the reset conduit 14 by a spring 38, which is compressed between the piston 31 and the exhaust fitting 17. In this "off" position (see Figs. 5 and 7) the piston 31 blocks off the inlet port 22 from the outlet ports 20. At the same time the outlet conduit 21 is bled off to the atmosphere through the opening 18 in the exhaust fitting.

In its "on" position (shown in Fig. 4) the valve stem 30 is held by a latch in a position where the piston 31 blocks off the outlet ports 20 from the bleed opening 18, and air may pass freely from the inlet port 22 through the clearance around the spool 32 and into the outlet ports 20.

A preferred form of latch 40 (shown in Figs. 4 and 5) comprises a pivoted rigid latch member having a tapered depending foot 41. The foot 41 is adapted to engage the shoulder 36 on the spool—34—side of the piston 33 and thereby hold the valve 30 in open position.

The housing 11 is bored horizontally at 42 to receive the latch pivot pin 43, and is grooved vertically at 44 so that the latch member 40 may swing vertically about the pin 43. The foot 41 fits in a vertical bore 45 which intersects the passageway 12 at an appropriate location.

The housing 11 is also bored vertically at 46 to accommodate a spring 47, which is compressed between the upper surface of the latch 40 and an Allen screw 48. The spring 47 urges the latch member 40 down toward its latched position, but it is a weaker spring than the spring 38. The latch 40 is latched either by a mechanical device to push the piston 35 over or by the air-reset mechanism described later on in this specification.

When the reset mechanism is retracted or the reset air stream is turned off, the latch member 40 would not hold were it not for a latch release member 50, whose leg 51 rests on a step 52 in the latch 40, just above the foot 41. The latch release member 50 is an L-shaped member supported by a pivot pin 53 for swinging movement in the groove 44.

The pivot pin 53 is located vertically above the edge of the step 52, so that the vertical component of the thrust from the spring 38 is resolved along the rigid leg 51, and the latch 40 cannot be released until an outside force lifts the long release finger 55. Then the member 50 pivots around the pin 53, the leg 51 falls off the step 52, and the spring 38 snaps the latch 40 up as the valve 30 moves to its "off" position.

Preferably the latch edge below the step 52 is sloped at 56, so that during resetting the leg 51 may slide up the slope 56 until it reaches its latching position on top of the step. This structure has advantages over a straight edge, because the inclined slope gives a smooth action whereas with a straight edge, the leg 51 is latched with a sudden jerk. If the member 50 does jerk suddenly, it may bounce out of position instead of remaining on the step. Since the reset operation is usually accomplished by a single blast of air, the valve 30 might then return to its "off" position before the latch is secure.

For convenience, the operation of the valve 10 will be described, beginning with the valve in its "off" position (Fig. 5). The valve is first set, as described above, either mechanically or hydraulically by pressure introduced through the fitting 14 against the piston 35. The stem 30 is moved in the passageway 12 until the latch foot 41 drops down onto the spool 34 against the piston 33. At the same time the leg 51 rests on the step 52 and the latch 40 holds the stem 30 in its open position. Then air passes from the inlet conduit 23 around the spool 32 and into the outlet work conduit 21.

Air continues to flow until the finger 55 is lifted. Then the latch release leg 51 slides off the step 52, and the spring 38 forces the latch 40 out of the notch 34. This releases the stem 30, which then moves to its "off" position. Then the inlet conduit 23 is blocked off by the piston 31, and air bleeds off from the outlet conduit 21 through the ports 20 and the exhaust fitting 17. The latch release leg 51 rests against the shoulder 56 of the latch 40, and the stem 30 cannot be reset until forcibly moved over against the resistance of the spring 38.

Fig. 9 shows a modified latch 140 which is similar to the latch 40, except that it has no integral foot 41. A ball 141 fits in the bore 45 below the latch 140. In latched position the ball 141 lies on the spool 34 and against the shoulder 36 of the piston 33. The latch 140 operates very much like the latch 40, and illustrates the fact that there are equivalents to several parts of this control valve.

Figs. 10 and 11 show a modified form of latch release. The latch 145 is similar to the latch 40, except that instead of a step 52 and a slope 56, it has a long continuous slope 146. It is urged to a down (latching) position by a spring 147.

An intermediate latch 150 is pivoted on a pin 151 directly above the vertical bore 45. The end 153 of its leg 152 is preferably sloped, to slide on the slope 146. The latch 150 is urged downwardly by the compression force of a small spring 157, and its horizontal arm 154 is preferably stepped at 155. The forward edge 156 of the arm 154 is also sloped. Both the step 155 and edge 156 function like their counterparts in the device shown in Fig. 4.

The leg 161 of the release finger member 160 rests on the step 155 when in latched position. The pivot pin 162 of the member 160 is vertically above the edge of the step 155, so that the upward thrust is resolved along the rigid leg 161. The release finger 165 operates in a manner similar to the finger 55, but has the advantage that it is even more sensitive than the single release mechanism. This type of latch and latch release thus has special suitability for exactly weighing very small quantities. Other things being equal, a smaller force is required to lift the finger 165 than is required to lift the finger 55 in the device of Fig. 4. When the finger 165 is released, the vertical component of the thrust of the spring 38 through stem 30 is more than sufficient to lift the latch 145 against the two springs 147 and 157.

Fig. 1 shows an automatic weighing mechanism employing two valves of the type described and numbered 10a and 10b in Fig. 12. The container 60 to be filled rests on the weighing platform 61 directly beneath a dump valve 62. The conduit 58 leads from the fluid storage to the dump valve 62 through a preliminary two-position valve 59. A rod 63, lever 64 and rod 65 connect the platform 61 to the scale beam 66 at a point adjacent but on one side of the fulcrum 67.

On the opposite side of the fulcrum 67 is a counterweight 68 which may be adjusted along the beam for varying the weight of material to be dispensed into the container 60.

On the same side of the beam 66 as the rod 65 there is a stud 69 in contact with both leaves of a double-leaf flex 70. The flex 70 prevents the scale beam from swinging up suddenly when the scale comes into balance. From the time the scale beam contacts the flex until the weighing is completed, the strength of the flex is a factor in determining its weight. There may also be another stud 71 on the end of the scale beam 66, which is secured to or engages a rod 72. The rod 72 is connected to a dashpot 73 which damps the swing of the beam after the critical balance weight has been reached. These are usual scale parts and individually constitute no part of the present invention.

Secured to the same side of the beam 66 as the counterweight 68 is a control rod 75 which extends up into a control box 76. This box 76 (the back side of which is shown in more detail in Fig. 12) holds the two control valves 10a and 10b. These valves are identical and are the same as the valve 10 which has been described above in detail. Both of their housings 11 are preferably bored horizontally at 77, in line with the axis of their fingers 55. A pin 78 passes through each bore 77 into the box 76 and thus pivotally holds each housing 11 for movement in a vertical plane.

A pair of guide arms 80 project out from each valve housing 11 and are spaced to fit snugly on both sides of their respective cams 81. When a cam 81 is rotated on its shaft 82, its associated valve housing 11 is moved around its pivotal mounting 78 and the vertical elevation of the outer end of the finger 55 is changed.

Each cam 81 may be adjusted from outside the box 76 by a device similar to that described in copending application, Serial No. 681,660, filed July 6, 1946, and now abandoned. It comprises a lever arm 83 (see Fig. 1 and the dotted lines in Fig. 12) rigidly secured to the cam shaft 82 and split at its outer end 84 to provide a fork to embrace the curved, threaded rod 86. The fork 84 also engages a wheel 85 mounted on the threaded rod 86 so that movement of the wheel 85 moves the arm 83 and determines the rotational position of the cam shaft 82 and the cam 81. A lock nut 87 is threaded around the rod 86 and serves two functions: to hold the wheel 85 from accidental displacement and to cooperate with the wheel during setting, to give a comparison of how much motion has been or is to be given the cam shaft.

When the wheel 85 moves along the rod 86, it turns the cam shaft 82 and the cam 81. As the cam 81 revolves it lifts or lowers its associated valve housing 11, with the result that the finger 55 is moved up or down, changing the point at which it will be engaged when the scale is weighing.

In weighing, end finger 55 is actuated by an adjustable collar 90, 91 secured to the rod 75.

When the scale beam 66 is moved, the rod 75 is pushed upwardly. At a predetermined weight the lower collar 90 will engage the finger 55 of the lower valve 10a, tripping its latch 40 and cutting off the air through its outlet tube 27. This moves the valve 59 to its dribble position. As the weighing continues, when the exact weight is reached, the collar 91 engages the finger 55 on the upper valve 10b and cuts off its outlet air supply through its outlet tube 27. This closes the dump valve 62.

There are thus several adjustments affecting the points at which the valves 10a and 10b will close; the counterweight 68, the flex 70, the position of the adjustable collars 90 and 91 and the position of the cams 81. In setting up to weigh out material, the first rough adjustment is made with the counterweight 68. The differences between cut off points in the two valves is determined by the flex 70 and by the collars 90 and 91. The flex 70 is normally standardized, and the collars are adjusted for a given type of operation. Then the fine adjustment is obtained by the knurled wheel 85.

A great advantage is obtained by using the present invention with a visual indicator 95. The needle 96 is adapted to rest at the center of the dial face 97 when the scale is in perfect balance. If the collars 90 and 91 (especially the latter) have not been adjusted perfectly, the indicator 95 will indicate this error, for, if the scale is not in perfect balance, the needle 96 will be to one side or the other of the center mark. If the filled container 60 is underweight, the wheel 85 is moved to raise the finger 55 somewhat on the valve 10b, so as to delay its closing of the dump valve 62. If the indicator shows that the container is overweight, the direction of the wheel 85 is reversed to correct for the next container. The weight can be made as exact as the indicator will read.

The valve 62 (which is completely described and claimed in my copending application, Serial No. 65,252, filed December 14, 1948), has two rates of flow and a closed position. Air pressure through the tube 100 (Fig. 12) moves both valves 10a and 10b to their "on" position, which in turn opens the dump valve 62 and the dribble valve 59 to its maximum feed position. When the valve 10a is tripped by the collar 90, it closes off the air through the tube 98, bleeds off the pressure through the exhaust opening 18 and the valve 59 moves to its dribble or minimum open position. When the second valve 10b closes off the air through the tube 99, the dump valve 62 is snapped completely shut, and will remain so until the valves 10a and 10b are reopened.

The valves 10a and 10b, as stated above, must be positively reset. In the device shown in Figs. 1 and 12, an air-reset mechanism is shown.

All of the air (both for resetting and for actuating the valves 59 and 62) may come from a single air supply conduit 100 connected to a suitable compressor (not shown). The air passes through a suitable moisture filter 101 and a lubricator 102 (see Fig. 1) into a manifold 103 inside the box 76. (See Fig. 12.) The manifold 103 has three outlet openings 105, 106 and 107. The flexible pipe 25a leads from the outlet 105 to the inlet fitting 24 of the lower control valve 10a; a flexible pipe 25b leads from the outlet 106 to the inlet fitting 24 of the upper control valve 10b. The third outlet 107 supplies air to a reset valve 110 through a pipe 111.

The reset valve 110 is shown in section in Fig. 13. Its housing 112 is bored through to provide a central passageway 113 having a narrow central portion 114 and wider outer portions or chambers 115 and 116. A hollow plug 117 is threaded into the end 115.

An inlet conduit 120 leads to the narrow passageway portion 114, and two outlets 121 and 122 lead from the chamber 115 to the flexible air reset tubes 15a and 15b, respectively, of the valves 10a and 10b.

A valve stem 125 is slidable along the passageway 113. Secured to the front end of the stem 125 is a closure member 126, whose rear edge 127 normally rests against the seat 128 and closes off the passage 114 from the chamber 115. The front end 129 of the member 126 is adapted to close the opening 130 of the plug, and when seated serves to send all of the air pressure from the inlet 120 out through the outlets 121 and 122. When the member 126 is in between its two seating positions, however, the air bleeds out the opening 130, so that the valves 10a and 10b cannot be reset unless the stem 125 is pushed all the way in. This prevents unintentional resetting when the cap 133 is touched accidentally.

The opposite end of the stem 125 extends out through packing 131 and a packing nut 132, which prevent leaks from the chamber 116. The stem 125 extends outside the housing 112, and at its end a reset cap 133 is rigidly held by a set screw 134. A spring 135 between the cap 133 and housing 112 normally urges the cap 133 away from the housing and keeps the inner end 127 of the closure member 126 against its seat 128. For convenience, the cover of the box 76 is bored, and the cap 133 extends outside the box on its front side (see Fig. 1).

When the cap 133 is depressed, the stem 125 is moved in against the force of the spring 135. At first, some of the air leaks out through the opening 130, but when the end 129 of the closure member 126 rests against the opening 130, the reset lines 15a and 15b are filled with air, and the valves 10a and 10b are simultaneously reset in the manner already described.

After the container 60 is filled, it is replaced with another empty container 60. Then the button 133 is pressed by the operator. The valves 10a and 10b open, and they, in turn, open the dump valve 62 and the dribble valve 59. Feeding begins fast and is automatically cut down to a dribble. When the exact weight is reached, the valve 62 is automatically cut off. Then the filled container 60 is again replaced with an empty container, and the cycle is repeated.

It will be evident from the above description and operation that the valve operates entirely on air pressure and requires no electrical mechanism. When the finger 55 is lifted the valve is positively tripped and must then be reset positively.

It will be noted that the large stream of air which can be transmitted directly through each valve 10 obviates the need for a supplemental valve. At the same time, the valve is very sensitive and responds quickly to the releasing of the latch. It bleeds off the air in the work outlet conduit 21 so that the dump valve 62 is closed immediately.

I claim:

1. A fluid control valve having sensitive release characteristics comprising a housing; a longitudinal cylindrical bore therein; an inlet passage into and an outlet passage from said housing, said inlet and said outlet passages being ported inside said housing on said bore in general proximity to each other; a close fitting piston-like member slidable in said bore, said member having a relieved spool-like reduced diameter portion in its body, whereby the movement of said piston-like member in one direction in said bore will separate said inlet and said outlet ports with its full diameter portion and when shifted longitudinally in the other direction will uncover said ports and connect them by means of said reduced diameter portion; a perforate closure member secured in the end of said bore nearer said outlet port to vent said outlet port when said piston-like member separates said inlet and outlet ports; a spring located between the end of said piston and one of said closure members for moving said piston into its port sealing position; a shoulder on said piston; a latching means pivoted in said housing and engageable with said shoulder through an opening in said bore wall; and a locking member for said latching means, said locking member being pivotally mounted on said housing and having a depending portion to lock said latch and a generally horizontal extending release finger portion projecting outwardly from its pivot point, whereby when said piston is latched in its valve open position, a very light upward pressure on said release finger will allow said spring to force the latch off said shoulder and to move the piston to separate said ports to close the valve.

2. The device of claim 1 in which air under pressure may be introduced through a second perforate closure member in the other end of the housing bore from the aforesaid perforate closure member to move the piston against the spring to set the locking member to lock open the valve until the piston is released by lifting on the release finger.

3. The device of claim 1 in which a spring is positioned on top of said latching means, said spring having less strength than the spring which moves said piston into its port sealing position.

4. The device of claim 1 in which the latching means has a sloping side along which the depending portion of the locking member slides as the latch is engaged.

5. The device of claim 1 in which the locking member comprises an L-shaped lever, pivoted where the two legs join and with one leg forming the depending portion and the other leg forming the release finger.

6. The device of claim 5 in which the above named L-shaped lever has its finger end engaged by the depending leg of a second L-shaped member, also pivoted in said housing.

7. An adjustment device for a mechanically actuated valve mechanism having a release finger projecting beyond the valve housing, said mechanism being actuated by a member which lifts said release finger, said adjustment device including in combination with the lifting mechanism a control box housing; means to support the housing of said valve pivotally in said box housing at a point distant from its release finger; a pair of guide members secured to the valve housing adjacent said release finger; and cam means fitting between and in contact with said guide members for swinging said valve housing about its pivot and thereby changing the actuation position of said release finger in respect to said lifting mechanism.

8. A control valve including in combination a valve housing; a mechanically actuated valve mechanism in said housing; a pivoted release finger for said mechanism projecting beyond said housing and adapted to release said mechanism for operation when said release finger is lifted; means for mounting said valve housing to swing bodily on a pivot generally parallel with the pivot for said release finger; and a cam-engaging face on said valve housing spaced away from said mounting means.

9. A fluid control valve having sensitive release characteristics comprising a housing; a longitudinal cylindrical bore therein; an inlet passage into and an outlet passage from said housing, said inlet and said outlet passages being ported inside said housing on said bore in general proximity to each other; a close fitting piston-like member slidable in said bore, said member having a relieved spool-like reduced diameter portion in its body, whereby the movement of said piston-like member in one direction in said bore will separate said inlet and said outlet ports with its full diameter portion and when shifted longitudinally in the other direction, will uncover said ports and connect them by means of said reduced diameter portion; means for normally holding said piston member yieldably in its port sealing position; a shoulder on said piston-like member; a latching means pivoted in said housing and engageable with said shoulder; and a locking member for said latching means, said locking member being pivotally mounted on said housing and having a depending portion to lock said latch and a generally horizontal-extending release finger portion projecting outwardly from its pivot point, whereby when said piston is latched in its valve open position, a very light upward pressure on said release finger will allow said yieldable piston holding means to force the latch means off said shoulder and to move the piston to separate said ports to close the valve; means for mounting said valve housing to swing bodily on a pivot generally parallel with the pivot for said release finger, and a cam engaging face on said valve housing spaced away from said mounting means.

10. A fluid control valve having sensitive release characteristics comprising a housing with a bore into which are ported an inlet passage and an outlet passage in general proximity to each other; a spool-shaped piston slidable in said bore to connect and to separate said inlet and outlet ports, said piston having a shoulder; spring means urging said piston toward its port separating position; a latch pivoted on said housing and engageable with said shoulder when said piston is in its port-connecting position but adapted except when locked in this position to be pushed out of engagement by the pressure of said spring means exerted through said piston; and a locking member pivotally mounted for free movement on said housing and having a generally-vertical depending portion to lock said latch and said piston in the port-connecting position and also having a release finger portion projecting generally horizontally outwardly from its pivot point, whereby a very light upward pressure on said release finger will disengage said depending portion from its locking position so that said spring means will force the latch off said shoulder and move the piston to its port-separating position.

11. The valve of claim 10 in which there is means for mounting said valve housing to swing bodily on a pivot generally parallel with the pivot for said release finger, and a cam engaging face on said valve housing spaced away from said mounting means.

11. The valve of claim 10 in which there is der comprises a recessed portion of said piston and is formed on a slope, in which there is a vertical bore in said housing located over the position occupied by said recessed portion when said piston is in its port-connecting position; in which said latch includes a member in said vertical bore adapted to fit in said recessed portion and to engage said shoulder and a rigid member pivotally mounted on said housing and operatively connected with said shoulder-engaging member; and in which said locking member is pivotally mounted substantially vertically above said vertical bore with its depending portion resting on said rigid member.

13. The valve of claim 12 in which the shoulder-engaging member and the rigid member are made in one piece, the shoulder-engaging portion comprising a depending foot-portion on said rigid member with its shoulder-engaging end sloped in from the top to bottom.

14. The valve of claim 12 in which the shoulder engaging member of said latch comprises a ball positioned in said vertical bore in contact with said piston and said rigid member.

15. The valve of claim 12 in which the rigid member has a step on its upper edge where said locking member may rest adjacent the edge when in locking position, and a sloping portion between said step and the outer end of said rigid member where said locking member may slide between its locked and unlocked positions.

16. The valve of claim 12 in which the locking member comprises an L-shaped lever pivoted where the two legs join, one of said legs forming the depending portion and the other leg forming the horizontally-extending release finger.

17. The valve of claim 16 in which the above-named L-shaped lever has its finger end engaged by the depending leg of a second L-shaped member also pivoted in said housing.

18. A fluid control valve having sensitive release characteristics and adapted to be reset by the fluid it controls, comprising a housing with a bore into which are ported an inlet passage and an outlet passage in general proximity to each other; a fluid supply conduit leading to said inlet passage; a spool-shaped piston slidable in said bore to connect and to separate said inlet and outlet ports, said piston having a shoulder; spring means urging said piston toward its port separating position; a latch pivoted on said housing and engageable with said shoulder when said piston is in its port-connecting position but adapted except when locked in this position to be pushed out of engagement by the pressure of said spring means exerted through said piston; a generally vertical locking member pivotally mounted on said housing and having a depending portion to lock said latch and said piston in the port-connecting position and also having a release finger portion projecting generally horizontally outwardly from its pivot point, whereby a very light upward pressure on said release finger will disengage said depending portion from its locking position so that said spring means will force the latch off said shoulder and move the piston to its port-separating position; a branch of said fluid supply conduit leading into said bore on the end toward which said piston is urged by said spring means; and a reset valve at the junction of said fluid supply conduit and said branch normally in position to send said fluid only to said inlet passage but operable when actuated to divert said fluid into said branch to reset said piston.

19. A latch mechanism for a valve sensitive to quick release comprising a piston member having a recess, means whereby said member is normally urged away from its open position; a latch member adapted to fit in said recess and to engage the shoulder at one end of said recess when said valve is in its open position; a rigid member pivotally supported and adapted to urge said latch member downwardly into locking position against said recess with less strength than the upward thrust of the force urging said piston member away from said open position; and a locking member mounted pivotally at a locus substantially vertically above the forward edge of said rigid member and having a depending portion adapted to rest thereon when said latch member is in holding position, whereby the vertical thrust is directed along said depending portion, said locking member having a release finger extending out from its pivot point so that a small movement of said finger will move said depending portion off the forward edge of said rigid member and said piston can move to its closed position.

20. A fluid control valve having sensitive release characteristics comprising a housing with a bore into which are ported an inlet passage and an outlet passage in general proximity to each other; a piston slidable in said bore having means to connect and to separate said inlet and outlet ports, said piston having a shoulder; return means for urging said piston toward its port separating position; a latch pivoted on said housing and engageable with said shoulder when said piston is in its port connecting position but adapted except when locked in this position to be pushed out of engagement by the pressure of said return means exerted through said piston; and a locking member pivotally mounted for free movement on said housing and having a generally-vertical depending portion to lock said latch and piston in the port-connecting position and also having a release finger portion projecting generally horizontally outwardly from its pivot point, whereby a very light upward pressure on said release finger will disengage said depending portion from its locking position so that said return means will force the latch off said shoulder and move the piston to its port-separating position.

ROBERT B. BROWN.

REFERENCES CITED

The following references are of record in the file of this patent:

UNITED STATES PATENTS

| Number | Name | Date |
|---|---|---|
| 826,502 | Hanson | July 17, 1906 |
| 1,235,825 | McCrabb | Aug. 7, 1917 |
| 1,283,916 | Rogers | Nov. 5, 1918 |
| 1,513,038 | Fortier | Oct. 28, 1924 |
| 1,717,692 | Kamedish | June 18, 1929 |
| 1,905,014 | Teller | Apr. 25, 1933 |
| 2,040,864 | Mantz | May 19, 1936 |
| 2,278,655 | James | Apr. 7, 1942 |
| 2,408,842 | Garretson | Oct. 8, 1946 |
| 2,440,590 | Kegreese | Apr. 27, 1948 |
| 2,504,638 | Browning | Apr. 12, 1950 |